(12) United States Patent
Liu et al.

(10) Patent No.: US 11,285,546 B2
(45) Date of Patent: Mar. 29, 2022

(54) DEVICE FOR REMOVING FLASHES OF WHEEL BLANK

(71) Applicant: CITIC Dicastal Co., LTD, Qinhuangdao (CN)

(72) Inventors: Huiying Liu, Qinhuangdao (CN); Jian Li, Qinhuangdao (CN); Wendong Li, Qinhuangdao (CN)

(73) Assignee: CITIC Dicastal Co., LTD, Qinhuangdao (CN)

( * ) Notice: Subject to any disclaimer, the term of this patent is extended or adjusted under 35 U.S.C. 154(b) by 205 days.

(21) Appl. No.: 16/724,151

(22) Filed: Dec. 20, 2019

(65) Prior Publication Data

US 2020/0306841 A1 Oct. 1, 2020

(30) Foreign Application Priority Data

Mar. 26, 2019 (CN) .......................... 201910232016.8

(51) Int. Cl.
*B23C 3/02* (2006.01)
*B23Q 7/05* (2006.01)
*B23C 1/14* (2006.01)

(52) U.S. Cl.
CPC .................. *B23C 3/02* (2013.01); *B23C 1/14* (2013.01); *B23C 2215/085* (2013.01); *B23C 2220/20* (2013.01); *B23Q 7/05* (2013.01); *Y10T 409/30896* (2015.01); *Y10T 409/306048* (2015.01)

(58) Field of Classification Search
CPC .. B23Q 7/05; B23Q 7/055; B23C 1/14; B23C 3/02; B23C 3/12; B23C 2215/085; B23C 2220/20; Y10T 29/5124; Y10T 29/5196; Y10T 409/305824; Y10T 409/30532; Y10T 409/306048; Y10T 409/30896
USPC .......... 29/33 P, 563; 409/159, 168, 172, 224
See application file for complete search history.

(56) References Cited

U.S. PATENT DOCUMENTS

| | | | | |
|---|---|---|---|---|
| 6,126,174 A * | 10/2000 | Reece | .................... | B23B 31/185 279/2.24 |
| 6,185,818 B1 * | 2/2001 | Ito | .............................. | B23C 3/18 29/889.7 |
| 7,198,277 B2 * | 4/2007 | Gatton | .................... | B23B 31/14 157/16 |

(Continued)

FOREIGN PATENT DOCUMENTS

| | | | | |
|---|---|---|---|---|
| DE | 19949645 A1 * | 4/2001 | ............. | B23Q 39/04 |
| DE | 202009017339 U1 * | 4/2010 | ................ | B23B 3/30 |

*Primary Examiner* — Boyer D Ashley
*Assistant Examiner* — Michael Vitale
(74) *Attorney, Agent, or Firm* — Yong Chen

(57) ABSTRACT

A device for removing flashes of a wheel blank includes two layers of turnover mechanisms, wherein the lower-layer turnover mechanism realizes the initial positioning of a wheel and has the function of removing the flashes at both the inner side and the outer side of an inner rim of the wheel, and the upper-layer turnover mechanism realizes the secondary positioning of the wheel and has the function of removing the flashes on the outer rim side. By means of the two layers of turnover mechanisms, the flashes on the front face and end face of a wheel blank outer rim wheel lip, and the inner side and outer side of the inner rim are removed, and coaxial processing conversion and orderly takt connection are ensured. The disclosure also provides a method for removing flashes of a wheel blank.

3 Claims, 9 Drawing Sheets

(56) References Cited

U.S. PATENT DOCUMENTS

| | | | |
|---|---|---|---|
| 8,172,489 B2* | 5/2012 | Prust | B23B 31/16275 |
| | | | 408/132 |
| 2007/0273108 A1* | 11/2007 | Kitatsuru | B23B 31/185 |
| | | | 279/106 |
| 2014/0271016 A1* | 9/2014 | Chou | B23B 31/19 |
| | | | 409/224 |
| 2018/0361527 A1* | 12/2018 | Liu | B24B 27/0069 |
| 2019/0061089 A1* | 2/2019 | Liu | B24B 49/12 |
| 2019/0061092 A1* | 2/2019 | Liu | B24B 19/26 |
| 2019/0061101 A1* | 2/2019 | Liu | B24B 27/0069 |
| 2019/0063896 A1* | 2/2019 | Liu | G01B 5/207 |

* cited by examiner

DEVICE FOR REMOVING FLASHES OF WHEEL BLANK

CROSS-REFERENCE TO RELATED APPLICATIONS

The present application claims the priority of Chinese patent application No. 201910232016.8, filed on Mar. 26, 2019, which is hereby incorporated by reference in its entirety.

TECHNICAL FIELD

The disclosure relates to the technical field of removing of casting flashes of wheel blanks, in particular to a device for removing flashes on the front face and inner and outer rims of a wheel blank.

BACKGROUND

With the development of wheel manufacturing automation technology, feeding and discharging during wheel machining have been performed by a manipulator, which puts forward high requirements on the quality of a blank, that is, the surface of the wheel blank should be flat and free of flashes before machining. The fact that there is no flash on the surface of the wheel blank not only facilitates the accurate grasping of the manipulator, but also improves the processing and positioning of the blank. Based on the present situation, the present disclosure provides a device for removing flashes of a wheel blank from the perspective of process and takt efficiency. The device can completely remove the flashes on the front face and end face of a blank positioning wheel lip, and the outer side and inner side of an inner rim, and also ensure coaxial processing conversion and orderly takt connection.

SUMMARY

The disclosure aims to provide a device for removing flashes of a wheel blank, which can accurately remove the flashes of the wheel blank and provide high-quality blanks for machining.

In order to achieve the above purpose, the technical solution of the disclosure is as follows: The specific details and working conditions of the equipment provided by the present disclosure will be described below in conjunction with the accompanying drawings.

A device for removing flashes of a wheel blank consists of a wheel feeding roller way, a lower working roller way, a lower servo motor, a coupling, a bearing, a lower turnover table, a bearing block, a lower clamping cylinder, a lower left sliding plate, a lower right sliding plate, a first rack and pinion, lower clamping wheels, a first servo motor, a first rotary table, first guide rails, a left sliding table, an outer rim servo motor, an outer rim milling cutter, a left adjusting cylinder, a right adjusting cylinder, a right sliding table, an inner rim servo motor, an inner rim milling cutter, feed cylinders, a moving bracket, feed guide rails, sliders, an upper servo motor, an upper turnover table, an upper clamping cylinder, an upper left sliding plate, an upper working roller way, an upper right sliding plate, upper clamping wheels, a second rack and pinion, a second servo motor, a second rotary table, second guide rails, horizontal sliders, horizontal adjusting cylinders, positioning end-face servo motors, positioning end-face milling cutters and a wheel discharging roller way.

The device for removing the flashes of the wheel blank includes two layers of turnover mechanisms, wherein the lower-layer turnover mechanism realizes the initial positioning of a wheel and has the function of removing the flashes at both the inner side and the outer side of an inner rim of the wheel, and the upper-layer turnover mechanism realizes the secondary positioning of the wheel and has the function of removing the flashes on the outer rim side. By means of the two layers of turnover mechanisms, the flashes on the front face and end face of a wheel blank outer rim wheel lip, and the inner side and outer side of the inner rim are removed, and coaxial processing conversion and orderly takt connection are ensured.

The lower servo motor is arranged on the lower side face of a frame, the lower turnover table is arranged at an output end of the lower servo motor, and the lower servo motor controls the lower turnover table to turn over by 360 degrees. The upper end face of the lower turnover table is provided with the lower working roller way, and the height of the lower working roller way is consistent with the height of the wheel feeding roller way to realize connection. Clamping guide rails are symmetrically installed on the upper end face of the lower turnover table, the lower left sliding plate and the lower right sliding plate are symmetrically installed on the clamping guide rails and are connected through the first rack and pinion, and the four lower clamping wheels are fixed on the lower left sliding plate and the lower right sliding plate. An output end of the lower clamping cylinder is connected with the lower left sliding plate. When the wheel enters the lower working roller way through the wheel feeding roller way, the lower clamping cylinder is started. Under the action of the first rack and pinion, the lower left sliding plate and the lower right sliding plate move synchronously, and the four lower clamping wheels can position and clamp the wheel. The lower end face of the lower turnover table is fixedly provided with the first servo motor, an output end of the first servo motor is provided with the first rotary table, the two first guide rails are symmetrically arranged under the first rotary table, the left sliding table and the right sliding table are both arranged on the first guide rails, and the left adjusting cylinder and the right adjusting cylinder are both fixed on the first rotary table. An output end of the left adjusting cylinder is connected with the left sliding table to control the left sliding table to move left and right, and an output end of the right adjusting cylinder is connected with the right sliding table to control the right sliding table to move left and right. The outer rim servo motor is fixed on the left sliding table, an output end of the outer rim servo motor is provided with the outer rim milling cutter, and the outer rim milling cutter is a forming milling cutter and has the same shape as the outer side of the inner rim of the wheel. When deflashing is performed on different wheels, the corresponding forming milling cutters may be installed. The left and right positions of the outer rim milling cutter may be adjusted by the left adjusting cylinder, so that the outer rim milling cutter can be suitable for removing flashes of wheels with different outer diameters. The inner rim servo motor is fixed on the right sliding table, an output end of the inner rim servo motor is provided with the inner rim milling cutter, and the inner rim milling cutter is a forming milling cutter and has the same shape as the inner side of the inner rim of the wheel. When deflashing is performed on different wheels, the corresponding forming milling cutters may be installed. The left and right positions of the inner rim milling cutter may be adjusted by the right adjusting cylinder, so that the inner rim milling cutter can be suitable for removing flashes of wheels with different outer diameters. This is the lower-layer turnover mechanism, which realizes the initial positioning of the wheel and has the function of removing the flashes at both the inner side and the outer side of the inner rim of the wheel.

The feed cylinders are fixedly arranged at the upper part of the frame, the moving bracket is arranged at output ends of the feed cylinders, the sliders are arranged on two sides of the front end of the moving bracket, the sliders are arranged on the feed guide rails, and the feed guide rails are fixed on two sides of the frame. The upper servo motor is fixed on the right slider, an output end of the upper servo motor is connected with the upper turnover table, and the upper servo motor may control the upper turnover table to turn over by 360 degrees. The upper end face of the upper turnover table is provided with the upper working roller way, and the rolling direction of the upper working roller way is perpendicular to the rolling direction of the lower working roller way, so as to facilitate the discharging of wheel blanks. The height of the upper working roller way may be adjusted by the feed cylinders, so that the upper working roller way can be connected with the wheel discharging roller way. Like the lower turnover table, the upper end face of the upper turnover table is also provided with wheel clamping devices. Clamping guide rails are symmetrically installed on the upper end face of the upper turnover table. The upper left sliding plate and the upper right sliding plate are symmetrically installed on the clamping guide rails and are connected through the second rack and pinion. The four upper clamping wheels are fixed on the upper left sliding plate and the upper right sliding plate. An output end of the upper clamping cylinder is connected with the upper left sliding plate. The lower end face of the upper turnover table is fixedly provided with the second servo motor, an output end of the second servo motor is provided with the second rotary table, the four second guide rails are uniformly distributed on the second rotary table at intervals of 90 degrees, the four horizontal sliders are respectively installed on the four second guide rails, and the four horizontal adjusting cylinders are respectively connected with the four horizontal sliders. Each horizontal slider is provided with a positioning end-face servo motor, an output end of each positioning end-face servo motor is provided with a positioning end-face milling cutter, and each positioning end-face milling cutter is a forming milling cutter and has the same shape as a positioning end face of an outer rim of the wheel. When deflashing is performed on different wheels, the corresponding forming milling cutters may be installed. The left and right positions of the positioning end-face milling cutters may be adjusted by the horizontal adjusting cylinders, so that the positioning end-face milling cutters can be suitable for removing flashes of wheels with different outer diameters. This is the upper-layer turnover mechanism, which realizes the secondary positioning of the wheel and has the function of removing the flashes on the end face of the outer rim. The height of the upper working roller way is adjusted by the feed cylinders, so that the upper working roller way can be connected with the wheel discharging roller way, thus realizing wheel discharging.

The working process of the device for removing the flashes of the wheel blank mainly includes six working steps. First working step: the wheel enters the lower working roller way through the wheel feeding roller way, the lower clamping cylinder is started, the four lower clamping wheels position and clamp the wheel, then the feed cylinders are started to drive the sliders to downwards move to an appropriate position, then the four horizontal adjusting cylinders are started synchronously to drive the four horizontal sliders to move towards the center synchronously, the rotating positioning end-face milling cutters make contact with the end face of the outer rim of the wheel blank and can remove the flashes through milling, and then the second servo motor is started to drive the second rotary table to rotate by one circle to complete the whole-circle removal of the flashes on the front face of the wheel. Second working step: after the flashes on the front face of the wheel are removed, the cutters are restored to their original positions, the feed cylinders drive the sliders to move upwards to be restored to their original positions, then the upper servo motor is started to drive the upper turnover table to rotate by 180 degrees, the upper working roller way is switched to the lower portion, and the positioning end-face milling cutters are switched to the upper portion. Third working step: the feed cylinders are started to drive the sliders to downwards move to an appropriate position, then the upper clamping cylinder is started to drive the upper clamping wheels to clamp the front face and end face of the wheel, at the same time, the lower clamping wheels release the inner rim side of the wheel, then the feed cylinders drive the sliders to move upwards to lift the wheel from the lower working roller way into the air, at this point, the secondary positioning of the wheel is completed, and the coaxiality of the outer rim side and the inner rim side of the wheel is ensured during clamping conversion. Fourth working step: the lower servo motor is started to drive the lower turnover table to rotate by 180 degrees, the lower working roller way is switched to the lower portion, and the outer rim milling cutter and the inner rim milling cutter are switched to the upper portion and located directly below the wheel. Then, the feed cylinders are started to drive the wheel clamped in the air to downwards move to an appropriate position, the left adjusting cylinder drives the rotating outer rim milling cutter to make contact with the outer side of the inner rim of the wheel, the right adjusting cylinder drives the rotating inner rim milling cutter to make contact with the inner side of the inner rim of the wheel, and the first servo motor drives the first rotating table to rotate by one circle to realize the whole-circle removal of the flashes on the inner rim of the wheel. Fifth working step: after flashes of the wheel are removed, the outer rim milling cutter and the inner rim milling cutter are withdrawn and restored to their original positions, and the feed cylinders drive the sliders to upwards move to an appropriate position. Then the lower servo motor drives the lower turnover table to turn over by 180 degrees, the lower-layer turnover mechanism returns to the initial state, the upper servo motor drives the upper turnover table to turn over by 180 degrees, and the wheel clamped in the air is switched to a position above the upper-layer turnover mechanism. Sixth working step: the feed cylinders drive the sliders to move upwards, the height of the upper working roller way and the height of the wheel discharging roller way are enabled to be consistent so as to realize connection, the roller way rotates to complete the discharging of the wheel, and finally, the feed cylinders drive the sliders to move downwards to return to the initial state, thus completing deflashing of the first wheel. First to sixth working steps are repeated to realize deflashing of the next wheel, and so on.

The device realizes removal of the flashes on the front face and end face of the blank positioning wheel lip, and the inner side and outer side of the inner rim, and also ensures coaxial processing conversion and orderly takt connection. The device is ingenious in design, strong in universality and wide in adaptability, and can accurately remove the flashes of the wheel blank and provide high-quality blanks for machining.

Figure 1:
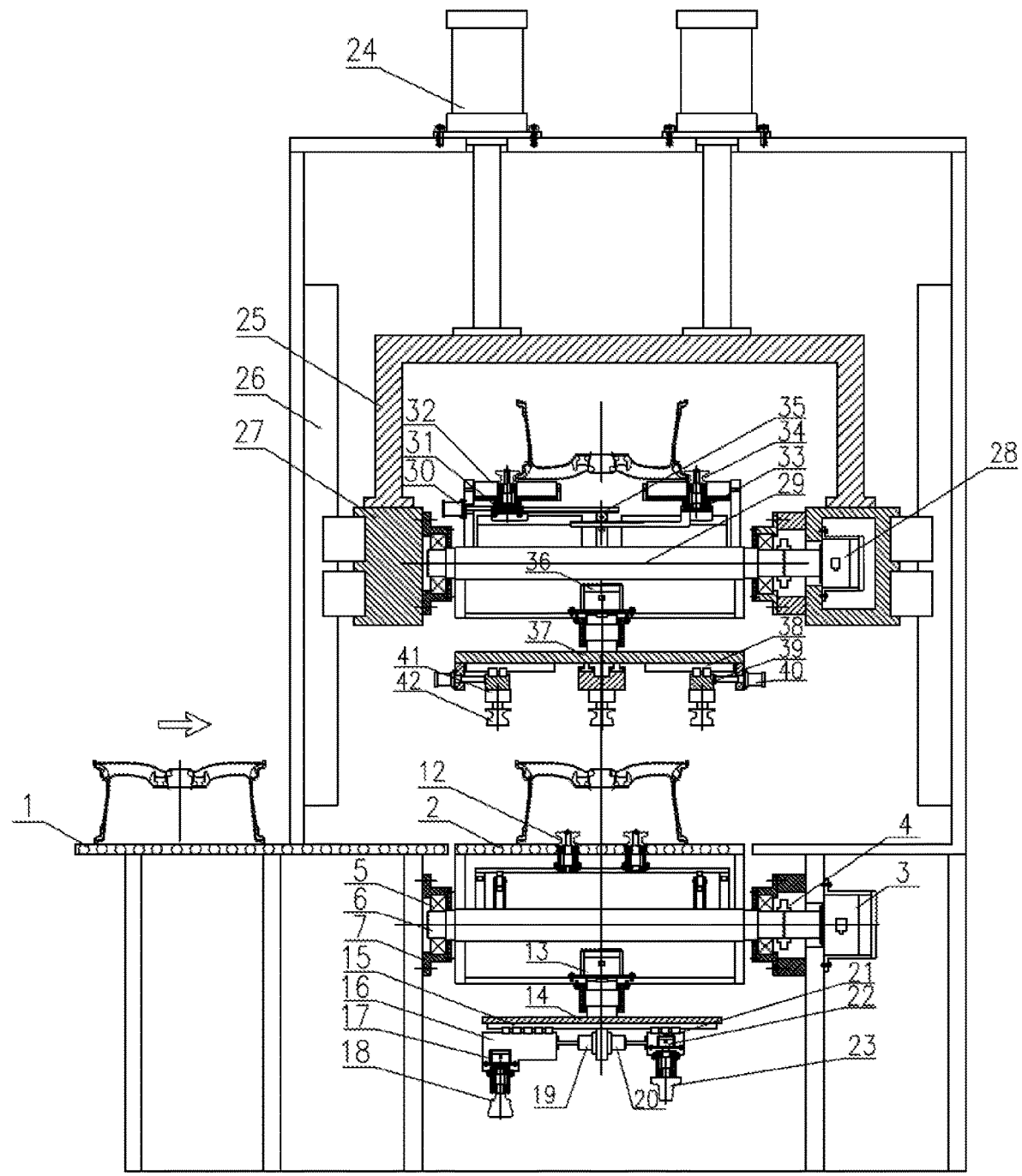
FIG. 1 is a front view of a device for removing flashes of a wheel blank according to the present disclosure.
Figure 2:
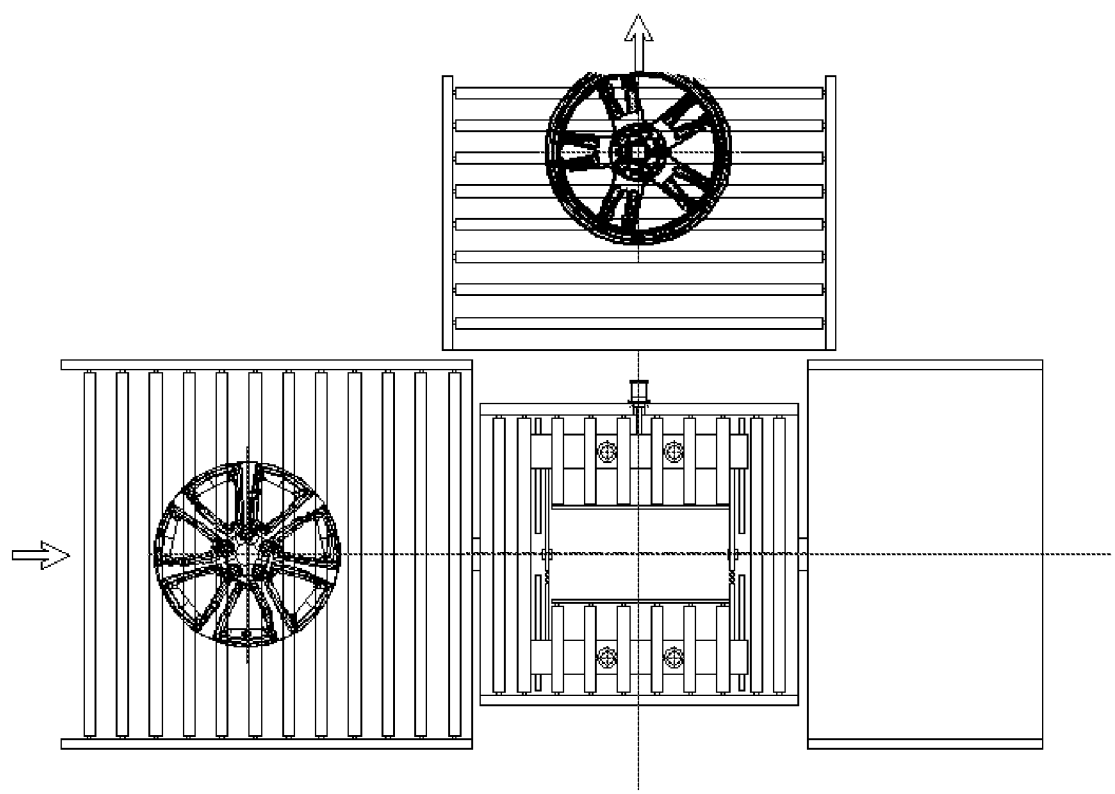
FIG. 2 is a top view of a device for removing flashes of a wheel blank according to the present disclosure.
Figure 3:
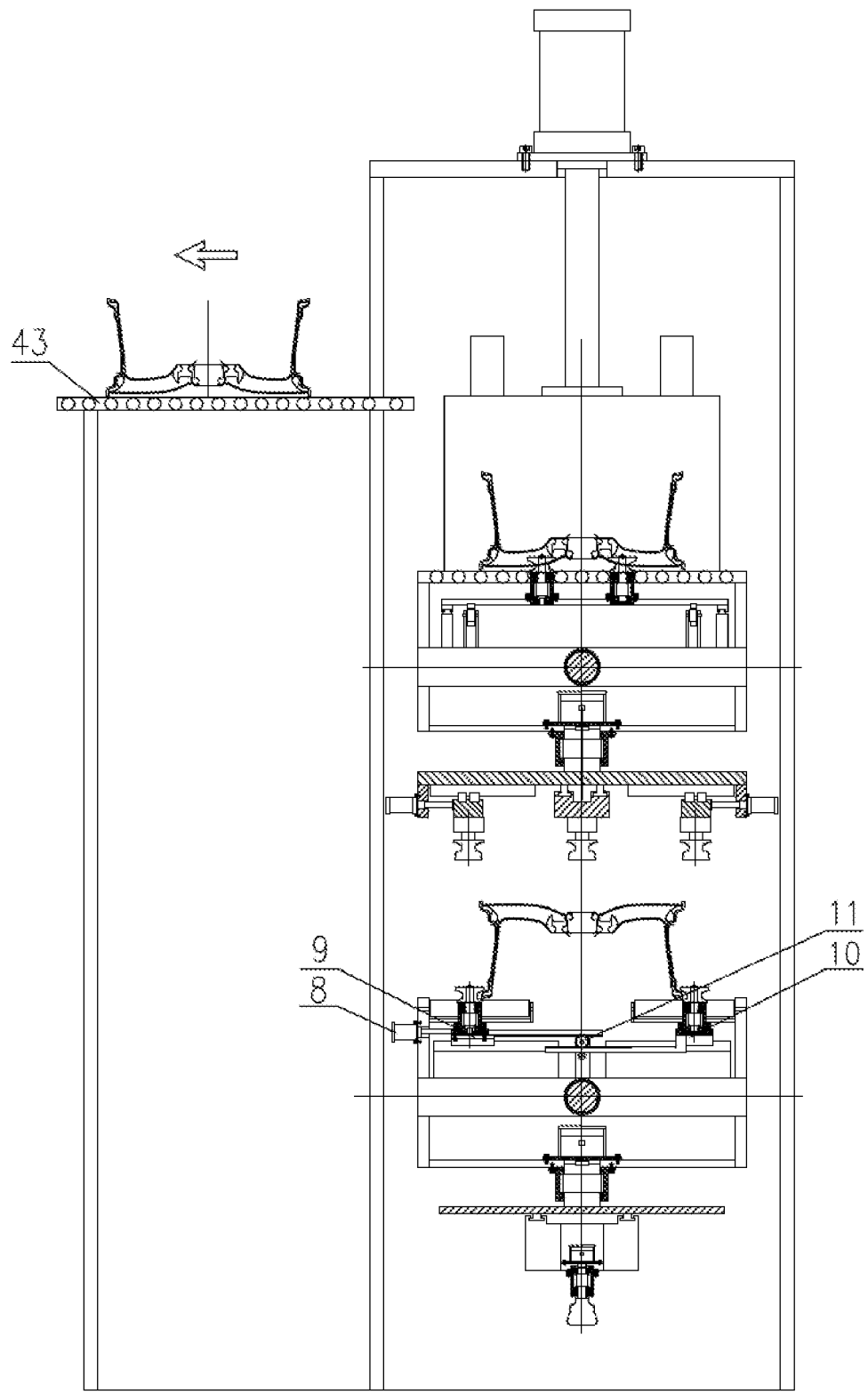
FIG. 3 is a left view of a device for removing flashes of a wheel blank according to the present disclosure.
Figure 4:
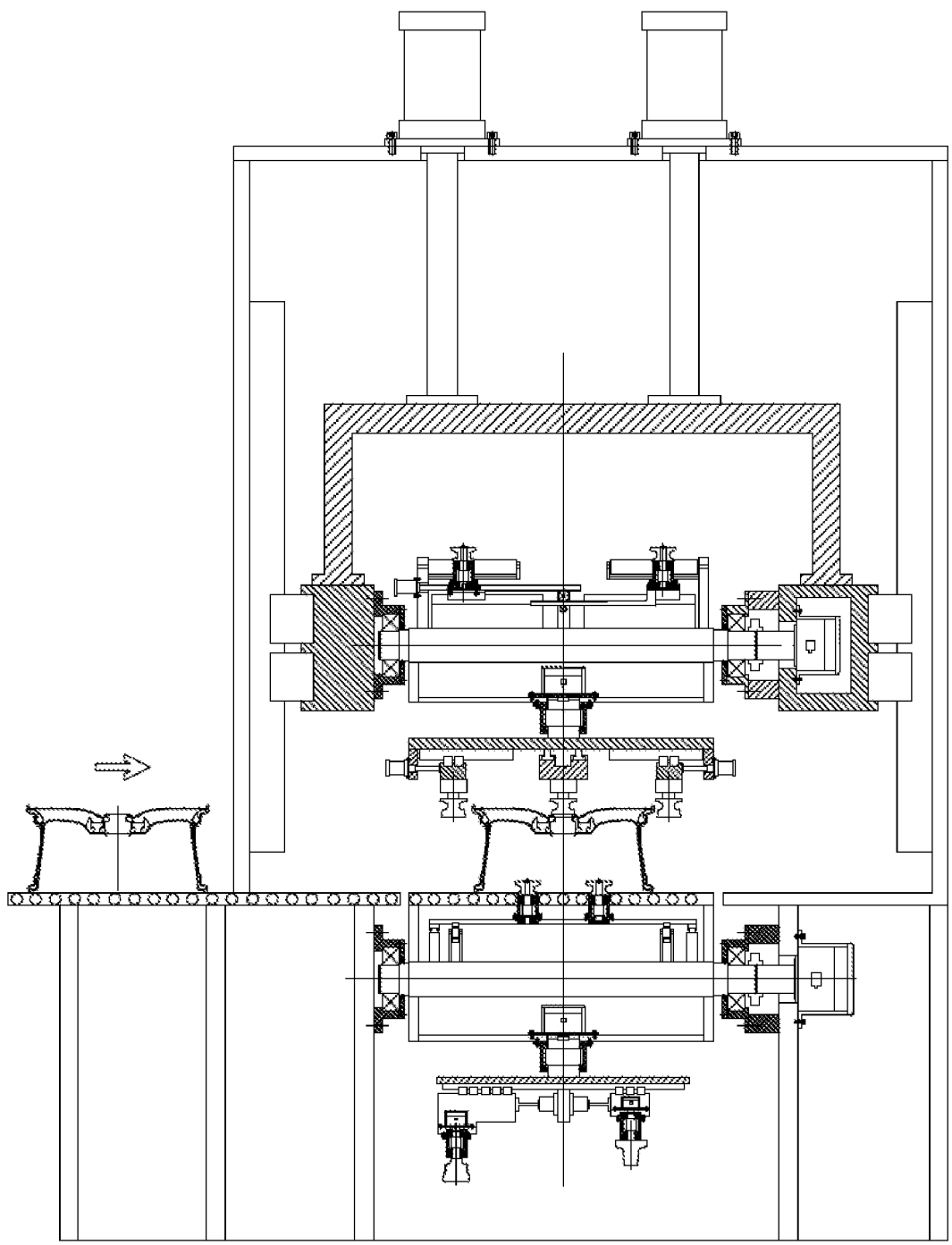
FIG. 4 is a schematic diagram of a first working step of a device for removing flashes of a wheel blank according to the present disclosure.
Figure 5:
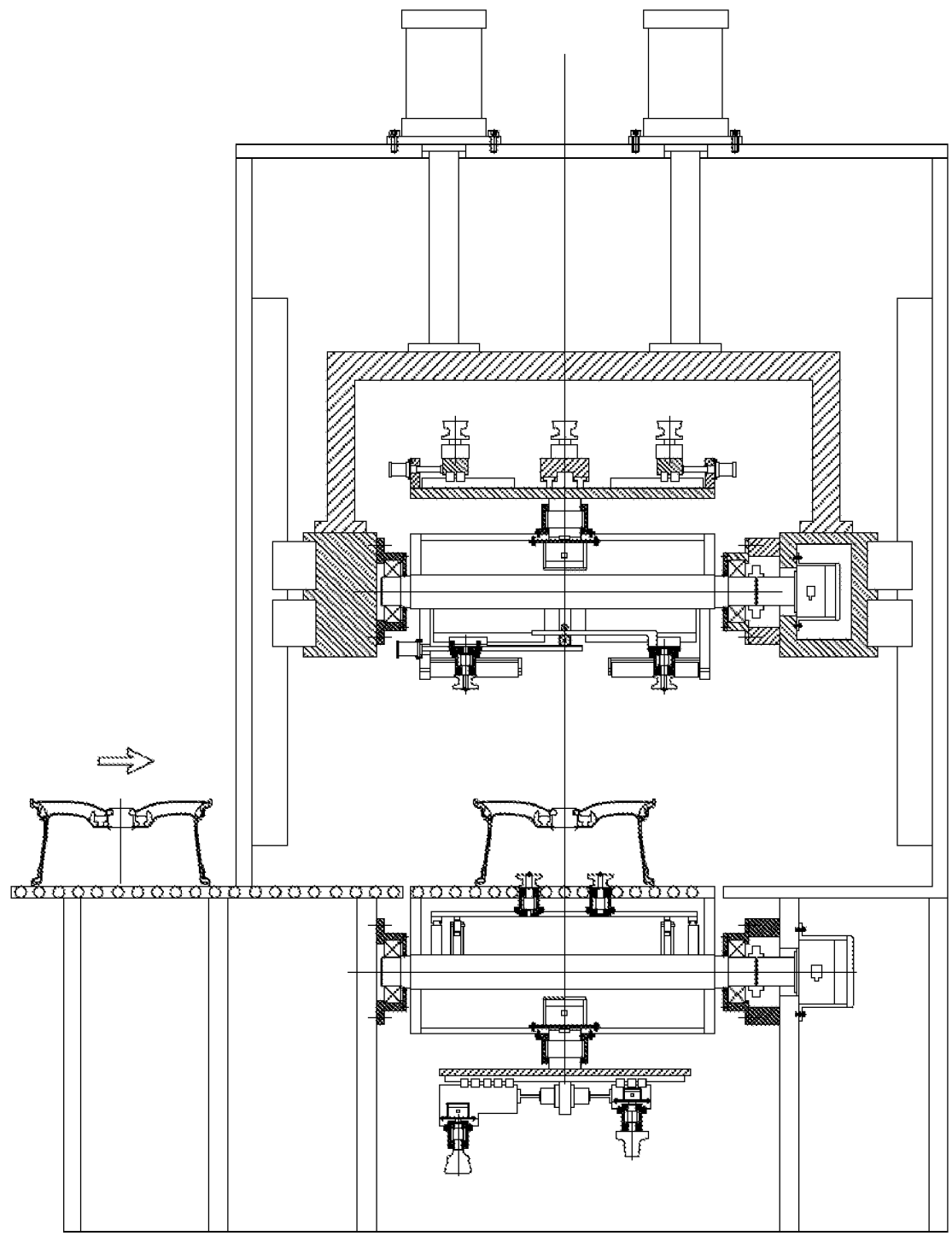
FIG. 5 is a schematic diagram of a second working step of a device for removing flashes of a wheel blank according to the present disclosure.
Figure 6:
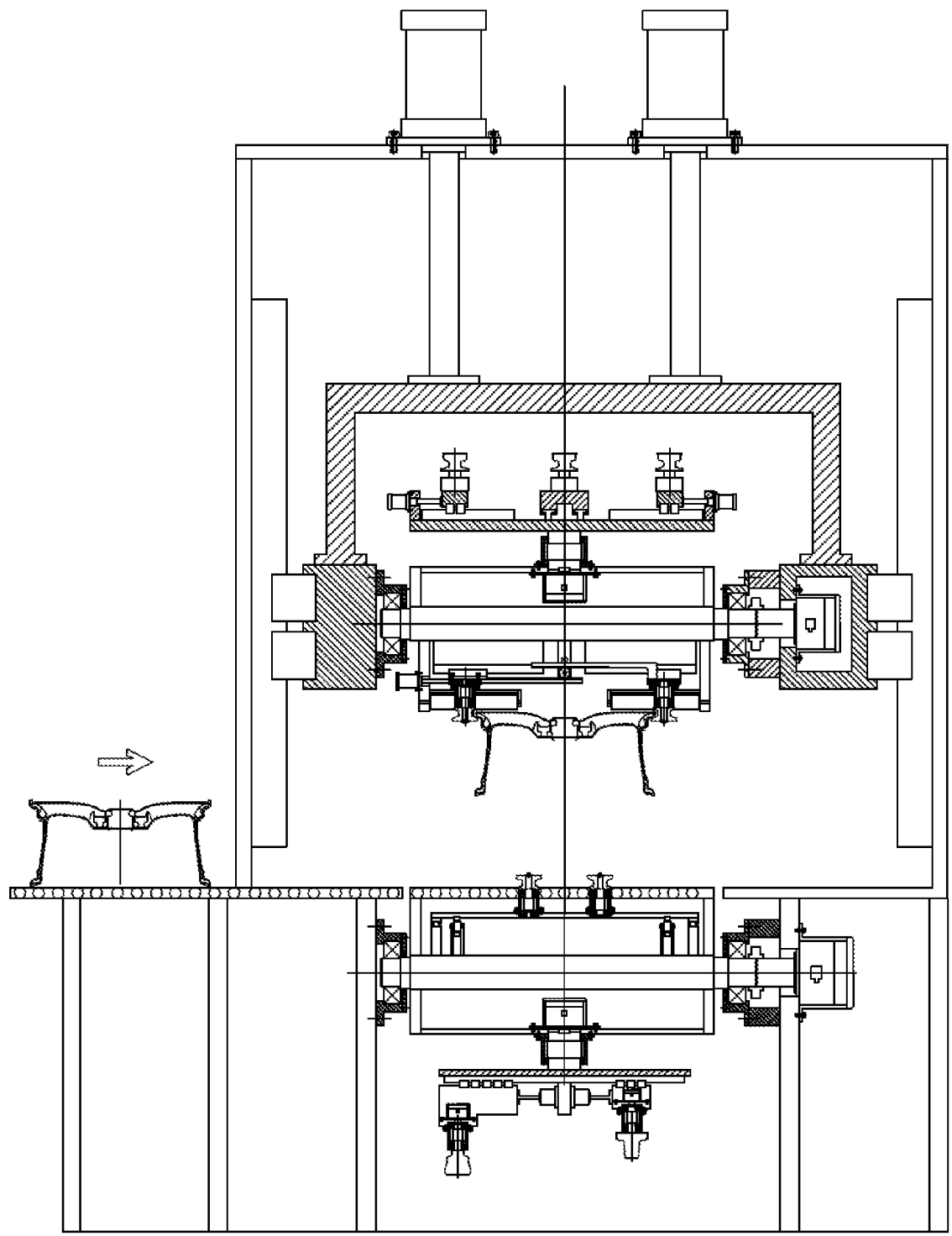
FIG. 6 is a schematic diagram of a third working step of a device for removing flashes of a wheel blank according to the present disclosure.
Figure 7:
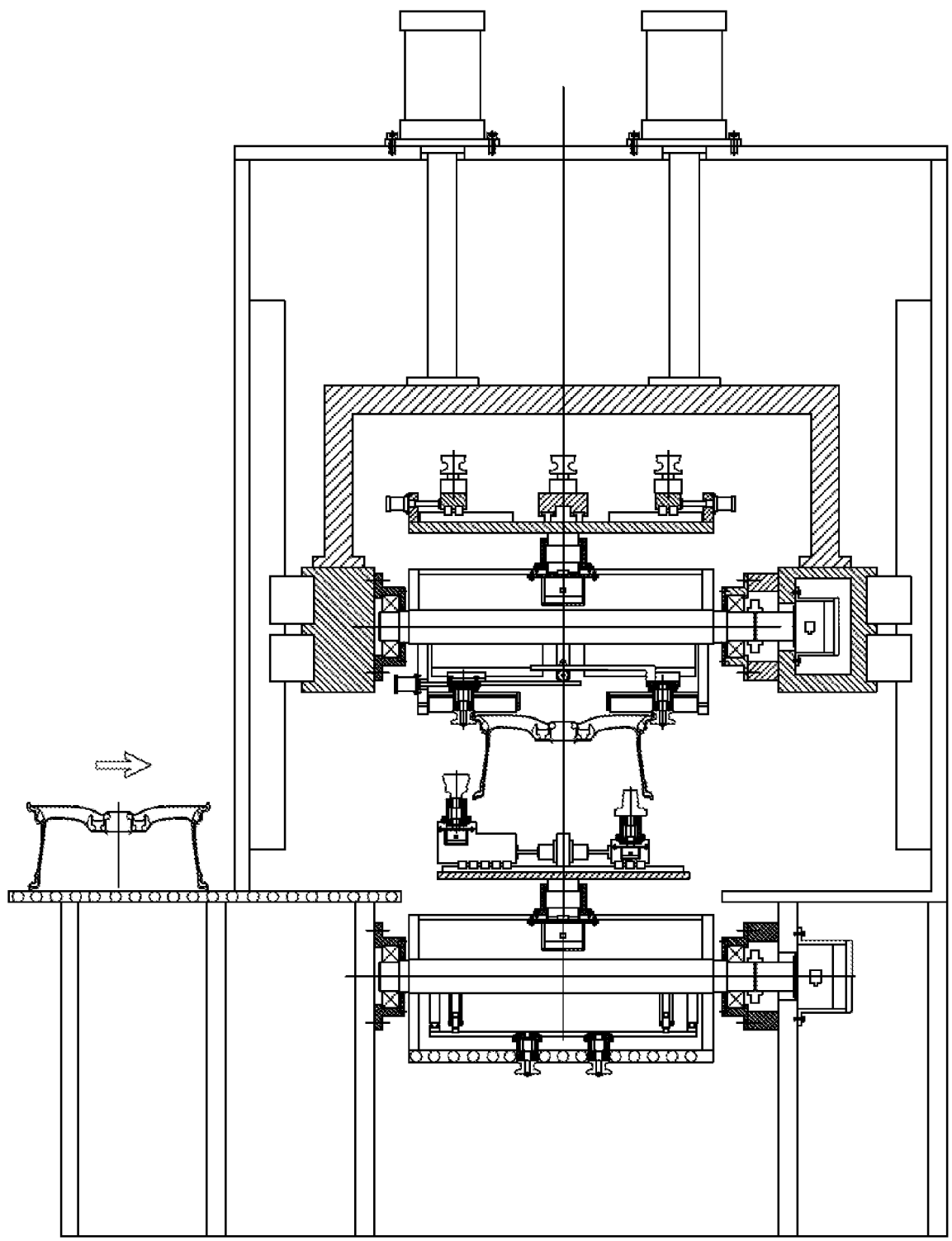
FIG. 7 is a schematic diagram of a fourth working step of a device for removing flashes of a wheel blank according to the present disclosure.
Figure 8:
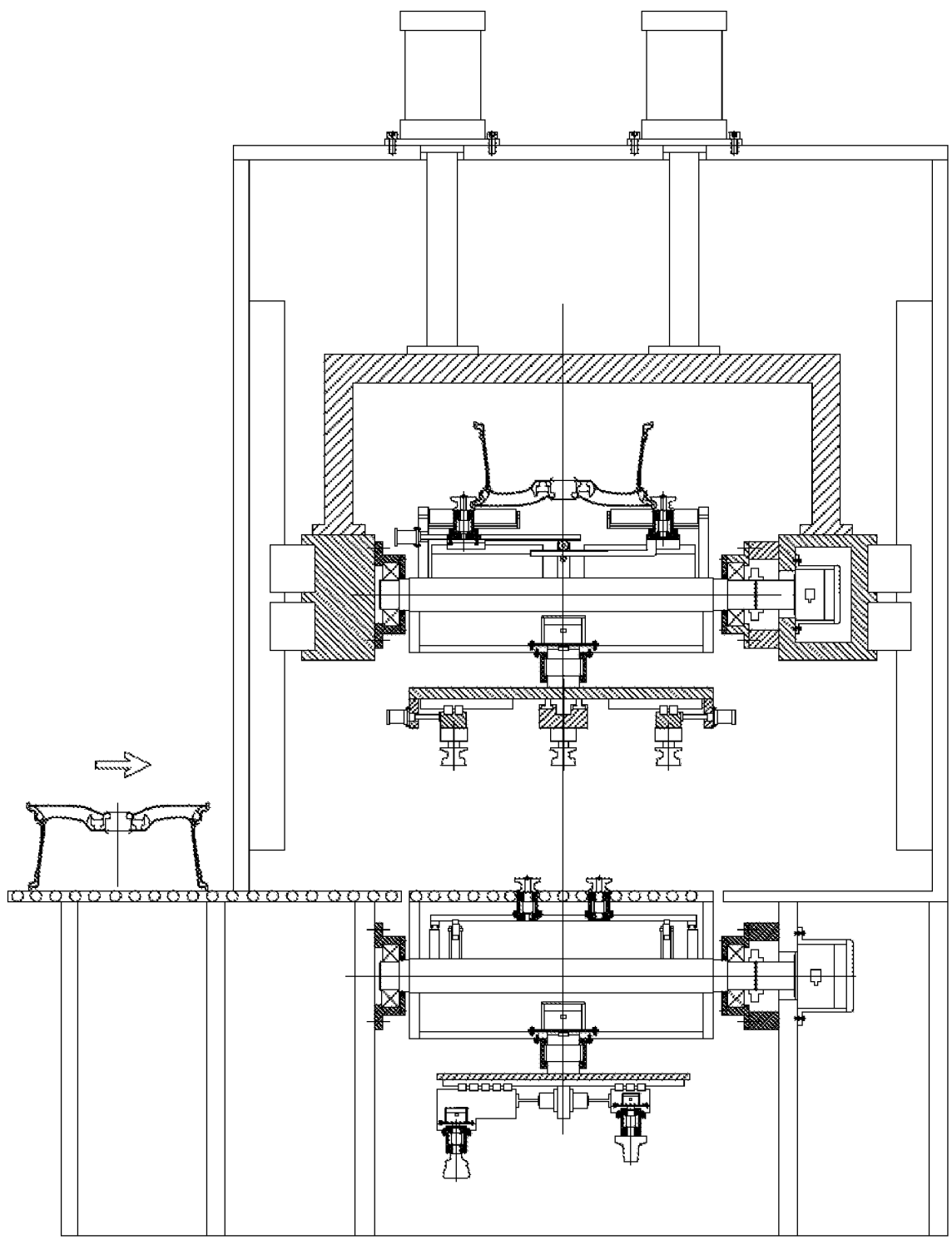
FIG. 8 is a schematic diagram of a fifth working step of a device for removing flashes of a wheel blank according to the present disclosure.
Figure 9:
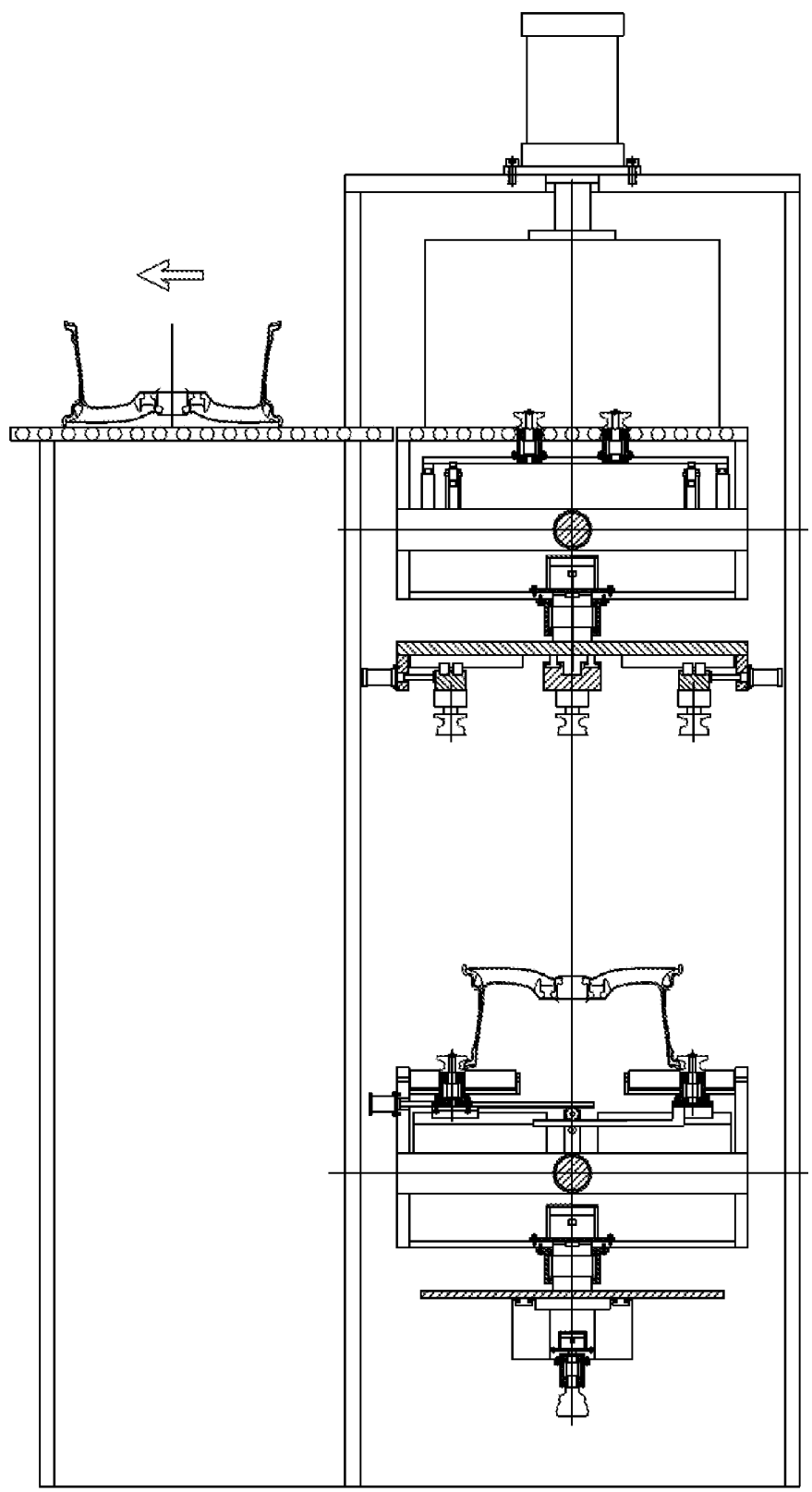
FIG. 9 is a schematic diagram of a sixth working step of a device for removing flashes of a wheel blank according to the present disclosure.

In the drawings, 1—wheel feeding roller way, 2—lower working roller way, 3—lower servo motor, 4—coupling, 5—bearing, 6—lower turnover table, 7—bearing block, 8—lower clamping cylinder, 9—lower left sliding plate, 10—lower right sliding plate, 11—first rack and pinion, 12—lower clamping wheel, 13—first servo motor, 14—first rotary table, 15—first guide rail, 16—left sliding table, 17—outer rim servo motor, 18—outer rim milling cutter, 19—left adjusting cylinder, 20—right adjusting cylinder, 21—right sliding table, 22—inner rim servo motor, 23—inner rim milling cutter, 24—feed cylinder, 25—moving bracket, 26—feed guide rail, 27—slider, 28—upper servo motor, 29—upper turnover table, 30—upper clamping cylinder, 31—upper left sliding plate, 32—upper working roller way, 33—upper right sliding plate, 34—upper clamping wheel, 35—second rack and pinion, 36—second servo motor, 37—second rotary table, 38—second guide rail, 39—horizontal slider, 40—horizontal adjusting cylinder, 41—positioning endface servo motor, 42—positioning end-face milling cutter, 43—wheel discharging roller way.

DETAILED DESCRIPTION

The specific details and working conditions of the equipment provided by the present disclosure will be described below in conjunction with the accompanying drawings.

A device for removing flashes of a wheel blank consists of a wheel feeding roller way 1, a lower working roller way 2, a lower servo motor 3, a coupling 4, a bearing 5, a lower turnover table 6, a bearing block 7, a lower clamping cylinder 8, a lower left sliding plate 9, a lower right sliding plate 10, a first rack and pinion 11, lower clamping wheels 12, a first servo motor 13, a first rotary table 14, first guide rails 15, a left sliding table 16, an outer rim servo motor 17, an outer rim milling cutter 18, a left adjusting cylinder 19, a right adjusting cylinder 20, a right sliding table 21, an inner rim servo motor 22, an inner rim milling cutter 23, feed cylinders 24, a moving bracket 25, feed guide rails 26, sliders 27, an upper servo motor 28, an upper turnover table 29, an upper clamping cylinder 30, an upper left sliding plate 31, an upper working roller way 32, an upper right sliding plate 33, upper clamping wheels 34, a second rack and pinion 35, a second servo motor 36, a second rotary table 37, second guide rails 38, horizontal sliders 39, horizontal adjusting cylinders 40, positioning end-face servo motors 41, positioning end-face milling cutters 42 and a wheel discharging roller way 43.

The device for removing the flashes of the wheel blank includes two layers of turnover mechanisms, wherein the lower-layer turnover mechanism realizes the initial positioning of a wheel and has the function of removing the flashes at both the inner side and the outer side of an inner rim of the wheel, and the upper-layer turnover mechanism realizes the secondary positioning of the wheel and has the function of removing the flashes on the outer rim side. By means of the two layers of turnover mechanisms, the flashes on the front face and end face of a wheel blank outer rim wheel lip, and the inner side and outer side of the inner rim are removed, and coaxial processing conversion and orderly takt connection are ensured.

The lower servo motor 3 is arranged on the lower side face of a frame, the lower turnover table 6 is arranged at an output end of the lower servo motor 3, and the lower servo motor 3 controls the lower turnover table 6 to turn over by 360 degrees. The upper end face of the lower turnover table 6 is provided with the lower working roller way 2, and the height of the lower working roller way 2 is consistent with the height of the wheel feeding roller way 1 to realize connection. Clamping guide rails are symmetrically installed on the upper end face of the lower turnover table 6, the lower left sliding plate 9 and the lower right sliding plate 10 are symmetrically installed on the clamping guide rails and are connected through the first rack and pinion 11, and the four lower clamping wheels 12 are fixed on the lower left sliding plate 9 and the lower right sliding plate 10. An output end of the lower clamping cylinder 8 is connected with the lower left sliding plate 9. When the wheel enters the lower working roller way 2 through the wheel feeding roller way 1, the lower clamping cylinder 8 is started. Under the action of the first rack and pinion 11, the lower left sliding plate 9 and the lower right sliding plate 10 move synchronously, and the four lower clamping wheels 12 can position and clamp the wheel. The lower end face of the lower turnover table 6 is fixedly provided with the first servo motor 13, an output end of the first servo motor 13 is provided with the first rotary table 14, the two first guide rails 15 are symmetrically arranged under the first rotary table 14, the left sliding table 16 and the right sliding table 21 are both arranged on the first guide rails 15, and the left adjusting cylinder 19 and the right adjusting cylinder 20 are both fixed on the first rotary table 14. An output end of the left adjusting cylinder 19 is connected with the left sliding table 16 to control the left sliding table 16 to move left and right, and an output end of the right adjusting cylinder 20 is connected with the right sliding table 21 to control the right sliding table 21 to move left and right. The outer rim servo motor 17 is fixed on the left sliding table 16, an output end of the outer rim servo motor 17 is provided with the outer rim milling cutter 18, and the outer rim milling cutter 18 is a forming milling cutter and has the same shape as the outer side of the inner rim of the wheel. When deflashing is performed on different wheels, the corresponding forming milling cutters may be installed. The left and right positions of the outer rim milling cutter 18 may be adjusted by the left adjusting cylinder 19, so that the outer rim milling cutter 18 can be suitable for removing flashes of wheels with different outer diameters. The inner rim servo motor 22 is fixed on the right sliding table 21, an output end of the inner rim servo motor 22 is provided with the inner rim milling cutter 23, and the inner rim milling cutter 23 is a forming milling cutter and has the same shape as the inner side of the inner rim of the wheel. When deflashing is performed on different wheels, the corresponding forming milling cutters may be installed. The left and right positions of the inner rim milling cutter 23 may be adjusted by the right adjusting cylinder 20, so that the inner rim milling cutter 23 can be suitable for removing flashes of wheels with different outer diameters. This is the lower-layer turnover mechanism, which realizes the initial positioning of the wheel and has the function of removing the flashes at both the inner side and the outer side of the inner rim of the wheel.

The feed cylinders 24 are fixedly arranged at the upper part of the frame, the moving bracket 25 is arranged at output ends of the feed cylinders 24, the sliders 27 are arranged on two sides of the front end of the moving bracket 25, the sliders 27 are arranged on the feed guide rails 26, and the feed guide rails 26 are fixed on two sides of the frame. The upper servo motor 28 is fixed on the right slider, an output end of the upper servo motor 28 is connected with the upper turnover table 29, and the upper servo motor 28 may control the upper turnover table 29 to turn over by 360 degrees. The upper end face of the upper turnover table 29 is provided with the upper working roller way 32, and the rolling direction of the upper working roller way 32 is perpendicular to the rolling direction of the lower working roller way 2, so as to facilitate the discharging of wheel blanks. The height of the upper working roller way 32 may be adjusted by the feed cylinders 24, so that the upper working roller way 32 can be connected with the wheel discharging roller way 43. Like the lower turnover table 6, the upper end face of the upper turnover table 29 is also provided with wheel clamping devices. Clamping guide rails are symmetrically installed on the upper end face of the upper turnover table 29. The upper left sliding plate 31 and the upper right sliding plate 33 are symmetrically installed on the clamping guide rails and are connected through the second rack and pinion 35. The four upper clamping wheels 34 are fixed on the upper left sliding plate 31 and the upper right sliding plate 33. An output end of the upper clamping cylinder 30 is connected with the upper left sliding plate 31. The lower end face of the upper turnover table 29 is fixedly provided with the second servo motor 36, an output end of the second servo motor 36 is provided with the second rotary table 37, the four second guide rails 38 are uniformly distributed on the second rotary table 37 at intervals of 90 degrees, the four horizontal sliders 39 are respectively installed on the four second guide rails 38, and the four horizontal adjusting cylinders 40 are respectively connected with the four horizontal sliders 39. Each horizontal slider 39 is provided with a positioning end-face servo motor 41, an output end of each positioning end-face servo motor is provided with a positioning end-face milling cutter 42, and each positioning end-face milling cutter 42 is a forming milling cutter and has the same shape as a positioning end face of an outer rim of the wheel. When deflashing is performed on different wheels, the corresponding forming milling cutters may be installed. The left and right positions of the positioning end-face milling cutters 42 may be adjusted by the horizontal adjusting cylinders 40, so that the positioning end-face milling cutters 42 can be suitable for removing flashes of wheels with different outer diameters. This is the upper-layer turnover mechanism, which realizes the secondary positioning of the wheel and has the function of removing the flashes on the end face of the outer rim. The height of the upper working roller way 32 is adjusted by the feed cylinders 24, so that the upper working roller way 32 can be connected with the wheel discharging roller way 43, thus realizing wheel discharging.

The working process of the device for removing the flashes of the wheel blank mainly includes six working steps. First working step: the wheel enters the lower working roller way 2 through the wheel feeding roller way 1, the lower clamping cylinder 8 is started, the four lower clamping wheels 12 position and clamp the wheel, then the feed cylinders 24 are started to drive the sliders 27 to downwards move to an appropriate position, then the four horizontal adjusting cylinders 40 are started synchronously to drive the four horizontal sliders 39 to move towards the center synchronously, the rotating positioning end-face milling cutters 42 make contact with the end face of the outer rim of the wheel blank and can remove the flashes through milling, and then the second servo motor 36 is started to drive the second rotary table 37 to rotate by one circle to complete the whole-circle removal of the flashes on the front face of the wheel. Second working step: after the flashes on the front face of the wheel are removed, the cutters are restored to their original positions, the feed cylinders 24 drive the sliders 27 to move upwards to be restored to their original positions, then the upper servo motor 28 is started to drive the upper turnover table 29 to rotate by 180 degrees, the upper working roller way 32 is switched to the lower portion, and the positioning end-face milling cutters 42 are switched to the upper portion. Third working step: the feed cylinders 24 are started to drive the sliders 27 to downwards move to an appropriate position, then the upper clamping cylinder 30 is started to drive the upper clamping wheels 34 to clamp the front face and end face of the wheel, at the same time, the lower clamping wheels 12 release the inner rim side of the wheel, then the feed cylinders 24 drive the sliders 27 to move upwards to lift the wheel from the lower working roller way 2 into the air, at this point, the secondary positioning of the wheel is completed, and the coaxiality of the outer rim side and the inner rim side of the wheel is ensured during clamping conversion. Fourth working step: the lower servo motor 3 is started to drive the lower turnover table 6 to rotate by 180 degrees, the lower working roller way 2 is switched to the lower portion, and the outer rim milling cutter 18 and the inner rim milling cutter 23 are switched to the upper portion and located directly below the wheel. Then, the feed cylinders 24 are started to drive the wheel clamped in the air to downwards move to an appropriate position, the left adjusting cylinder 19 drives the rotating outer rim milling cutter 18 to make contact with the outer side of the inner rim of the wheel, the right adjusting cylinder 20 drives the rotating inner rim milling cutter 23 to make contact with the inner side of the inner rim of the wheel, and the first servo motor 13 drives the first rotating table 14 to rotate by one circle to realize the whole-circle removal of the flashes on the inner rim of the wheel. Fifth working step: after flashes of the wheel are removed, the outer rim milling cutter 18 and the inner rim milling cutter 23 are withdrawn and restored to their original positions, and the feed cylinders 24 drive the sliders 27 to upwards move to an appropriate position. Then the lower servo motor 3 drives the lower turnover table 6 to turn over by 180 degrees, the lower-layer turnover mechanism returns to the initial state, the upper servo motor 28 drives the upper turnover table 29 to turn over by 180 degrees, and the wheel clamped in the air is switched to a position above the upper-layer turnover mechanism. Sixth working step: the feed cylinders 24 drive the sliders 27 to move upwards, the height of the upper working roller way 32 and the height of the wheel discharging roller way 43 are enabled to be consistent so as to realize connection, the roller way rotates to complete the discharging of the wheel, and finally, the feed cylinders 24 drive the sliders 27 to move downwards to return to the initial state, thus completing deflashing of the first wheel. First to sixth working steps are repeated to realize deflashing of the next wheel, and so on.

The device realizes removal of the flashes on the front face and end face of the blank positioning wheel lip, and the inner side and outer side of the inner rim, and also ensures coaxial processing conversion and orderly takt connection. The device is ingenious in design, strong in universality and wide in adaptability, and can accurately remove the flashes of the wheel blank and provide high-quality blanks for machining.

What is claimed is:

1. A device for removing flashes of a wheel blank, comprising a wheel feeding roller way, a lower working roller way, a lower servo motor, a coupling, a bearing, a lower turnover table, a bearing block, a lower clamping cylinder, a lower left sliding plate, a lower right sliding plate, a first rack and pinion, lower clamping wheels, a first servo motor, a first rotary table, first guide rails, a left sliding table, an outer rim servo motor, an outer rim milling cutter, a left adjusting cylinder, a right adjusting cylinder, a right sliding table, an inner rim servo motor, an inner rim milling cutter, feed cylinders, a moving bracket, feed guide rails, sliders, an upper servo motor, an upper turnover table, an upper clamping cylinder, an upper left sliding plate, an upper working roller way, an upper right sliding plate, upper clamping wheels, a second rack and pinion, a second servo motor, a second rotary table, second guide rails, horizontal sliders, horizontal adjusting cylinders, positioning end-face servo motors, positioning end-face milling cutters, and a wheel discharging roller way, wherein the upper end face of the upper turnover table is provided with the upper working roller way, the rolling direction of the upper working roller way is perpendicular to the rolling direction of the lower working roller way, and the height of the upper working roller way is adjusted by the feed cylinders, so that the upper working roller way can be connected with the wheel discharging roller way.

2. The device for removing flashes of a wheel blank according to claim 1, wherein the lower end face of the lower turnover table is fixedly provided with the first servo motor, an output end of the first servo motor is provided with the first rotary table, the two first guide rails are symmetrically arranged under the first rotary table, the left sliding table and the right sliding table are both arranged on the first guide rails, and the left adjusting cylinder and the right adjusting cylinder are both fixed on the first rotary table; an output end of the left adjusting cylinder is connected with the left sliding table to control the left sliding table to move left and right, and an output end of the right adjusting cylinder is connected with the right sliding table to control the right sliding table to move left and right; the outer rim servo motor is fixed on the left sliding table, an output end of the outer rim servo motor is provided with the outer rim milling cutter, and the outer rim milling cutter is a forming milling cutter and has the same shape as the outer side of the inner rim of the wheel; the left and right positions of the outer rim milling cutter are adjusted by the left adjusting cylinder; and the inner rim servo motor is fixed on the right sliding table, an output end of the inner rim servo motor is provided with the inner rim milling cutter, the inner rim milling cutter is a forming milling cutter and has the same shape as the inner side of the inner rim of the wheel, and the left and right positions of the inner rim milling cutter are adjusted by the right adjusting cylinder.

3. The device for removing flashes of a wheel blank according to claim 1, wherein the lower end face of the upper turnover table is provided with the second servo motor, an output end of the second servo motor is provided with the second rotary table, the four second guide rails are uniformly distributed on the second rotary table at intervals of 90 degrees, the four horizontal sliders are respectively installed on the four second guide rails, and the four horizontal adjusting cylinders are respectively connected with the four horizontal sliders; and each horizontal slider is provided with a positioning end-face servo motor, an output end of each positioning end-face servo motor is provided with a positioning end-face milling cutter, each positioning end-face milling cutter is a forming milling cutter and has the same shape as a positioning end face of an outer rim of the wheel, and the left and right positions of the positioning end-face milling cutters are adjusted by the horizontal adjusting cylinders.

\* \* \* \* \*